United States Patent
Schreurs et al.

(10) Patent No.: US 10,521,016 B2
(45) Date of Patent: Dec. 31, 2019

(54) ELECTRONIC DEVICE

(71) Applicant: Innolux Corporation, Miao-Li County (TW)

(72) Inventors: Jozef Egidius Maria Schreurs, Miao-Li County (TW); Jef Notermans, Miao-Li County (TW); Gerben Johan Hekstra, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 70 days.

(21) Appl. No.: 15/844,862

(22) Filed: Dec. 18, 2017

(65) Prior Publication Data
US 2019/0187793 A1    Jun. 20, 2019

(51) Int. Cl.
G06F 3/01 (2006.01)
G06F 1/16 (2006.01)

(52) U.S. Cl.
CPC .......... *G06F 3/016* (2013.01); *G06F 1/1637* (2013.01); *G06F 1/1656* (2013.01)

(58) Field of Classification Search
CPC ....... G06F 3/016; G06F 1/1637; G06F 1/1656
See application file for complete search history.

(56) References Cited

U.S. PATENT DOCUMENTS

| | | | |
|---|---|---|---|
| 2007/0080951 A1 | 4/2007 | Maruyama et al. | |
| 2009/0001855 A1* | 1/2009 | Lipton | G06F 3/016 310/331 |
| 2012/0139851 A1* | 6/2012 | Kim | G06F 3/016 345/173 |
| 2013/0342484 A1 | 12/2013 | Bae et al. | |
| 2018/0059794 A1* | 3/2018 | Nakamura | G06F 3/016 |
| 2018/0081483 A1 | 3/2018 | Camp et al. | |

FOREIGN PATENT DOCUMENTS

KR    20120006729 A    1/2012

OTHER PUBLICATIONS

EPO Search Report dated Apr. 18, 2019 in EP application (No. 18208014.3-1216).
Non-Final Office Action issued in U.S. Appl. No. 16/027,581, filed Jul. 5, 2018, dated Aug. 21, 2019.

* cited by examiner

*Primary Examiner* — Afroza Chowdhury
(74) *Attorney, Agent, or Firm* — McClure, Qualey & Rodack, LLP

(57) ABSTRACT

An electronic device includes a haptic touch panel including a touch surface, a housing, a counter mass, an actuator and an elastic plate. The actuator is connected to the haptic touch panel. The elastic plate includes a first portion connected to the haptic touch panel, a second portion connected to the counter mass, and a third portion connected to the housing.

14 Claims, 8 Drawing Sheets

ELECTRONIC DEVICE

TECHNICAL FIELD

The disclosure relates in general to an electronic device, and more particularly to an electronic device provided with haptic feedback.

BACKGROUND

Recently, an electronic device having a touch panel provided therein is commonly used in our daily lives, such as a smart phone, a navigation device for vehicles, a digital camera, and a digital video camera. Such an electronic device is usually provided with haptic feedback, like vibration or other movement, which can be aware by user to enhance user's experience.

However, when haptic feedback occurs, it is possible to generate unwanted vibration or movement to the housing of electronic device that accommodates the touch panel, thus resulting in a potential collision between the housing and the body where the housing is joined.

SUMMARY

According to one embodiment, an electronic device is provided. The electronic device includes a haptic touch panel including a touch surface, a housing, a counter mass, an actuator and an elastic plate. The actuator is connected to the haptic touch panel. The elastic plate includes a first portion connected to the haptic touch panel, a second portion connected to the counter mass, and a third portion connected to the housing.

Figure 1:
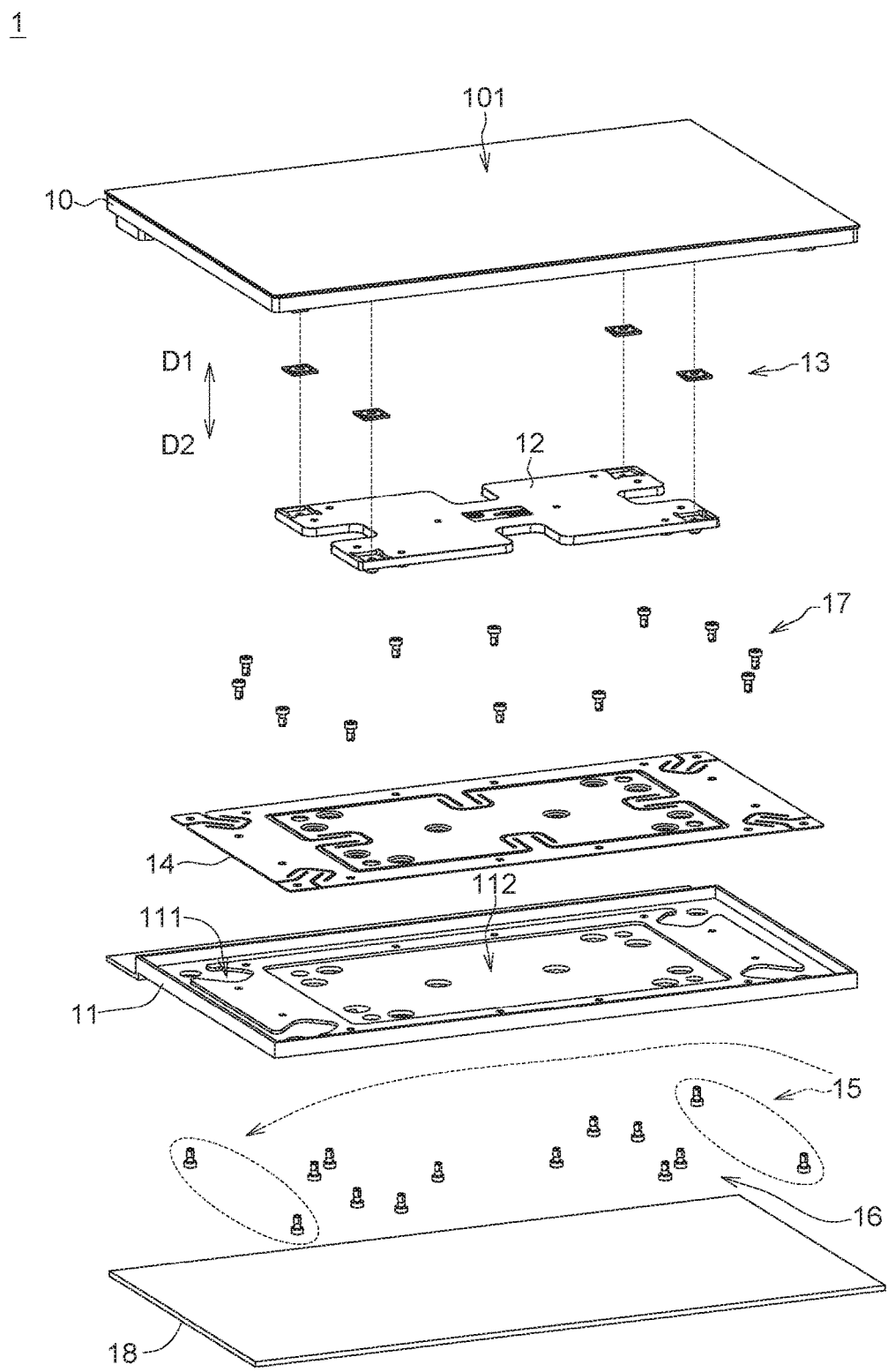
FIG. 1 shows an exploded view of an electronic device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

According to embodiments of the disclosure, in the electronic device, the counter mass is provided therein to compensate or counteract vibration of the haptic touch panel, such that the vibration will not be transmitted to the housing.

Detailed descriptions of the embodiments of the disclosure are disclosed below with accompanying drawings. In the accompanying diagrams, the same numeric designations indicate the same or similar components. It should be noted that accompanying drawings are simplified so as to provide clear descriptions of the embodiments of the disclosure, and the following detailed description are exemplary and explanatory only and are not restrictive of the disclosed embodiments as claimed. Anyone who is skilled in the technology field of the disclosure can make necessary modifications or variations to the structures according to the needs in actual implementations.

FIG. 1 shows an exploded view of an electronic device 1 according to an embodiment of the present disclosure. As shown in FIG. 1, the electronic device 1 includes a haptic touch panel 10 in the front of the electronic device 1, a housing 11, a counter mass 12, an actuator 13 and an elastic plate 14. The electronic device 1 may further include a decorative component 18 in the rear of the electronic device 1. The electronic device 1 may be integrated into a smart phone, a navigation device for vehicles, a digital camera or a digital video camera via the housing 11. In one embodiment, the haptic touch panel 10 may be a display panel with a touch screen integrated thereinto. When a user touches the touch surface 101 of the haptic touch panel 10, the haptic touch panel 10 may provide vertically dynamic vibration or movement to the user.

Figure 2A:
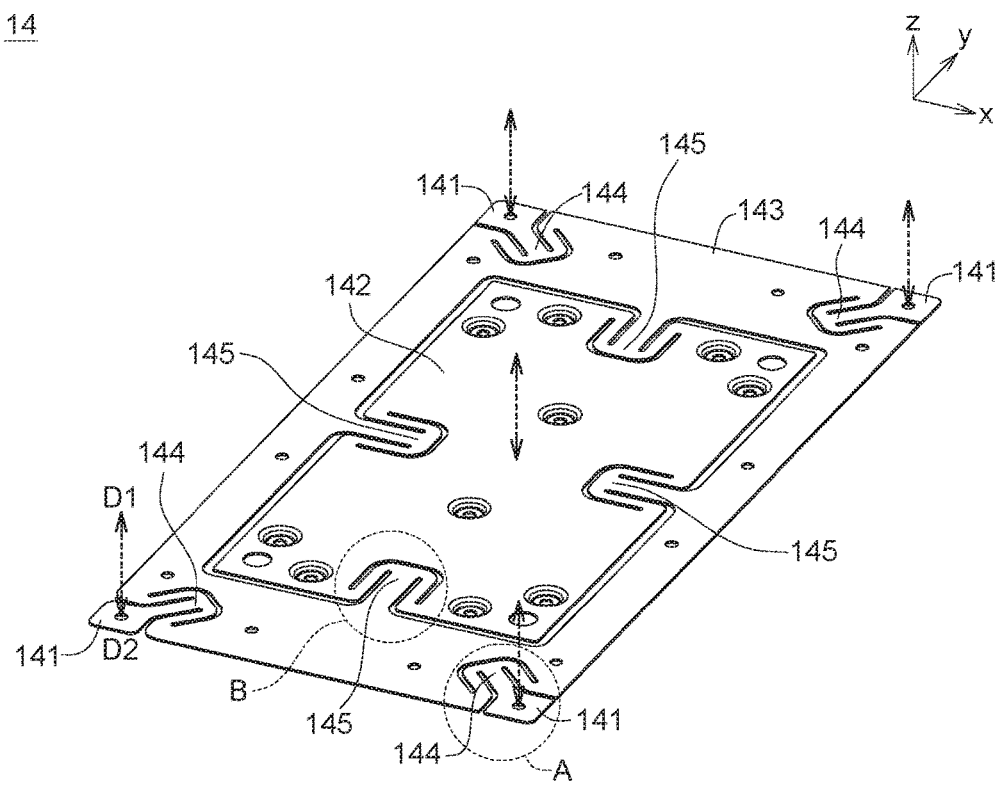
FIG. 2A shows a schematic view of an elastic plate of the electronic device of FIG. 1.

The elastic plate 14 may be connected to the haptic touch panel 10, the counter mass 12 and the housing 11. FIG. 2A shows a schematic view of the elastic plate 14 of the electronic device 1 of FIG. 1. As shown in FIG. 2A, the elastic plate 14 may include a first portion 141, a second portion 142 and a third portion 143. In one embodiment, there may be four first portions 141 at corners of the elastic plate 14, the second portion 142 may be located at a center portion of the elastic plate 14. The third portion 143 may be located between the second portion 142 and the four first portions 141. In detail, the third portion 143 may be located in the peripheral region of the elastic plate 14. For example, the second portion 142 may be surrounded by the third portion 143. The elastic plate 14 may be symmetrical. However, the present disclosure is not limited thereto.

Figure 2B:
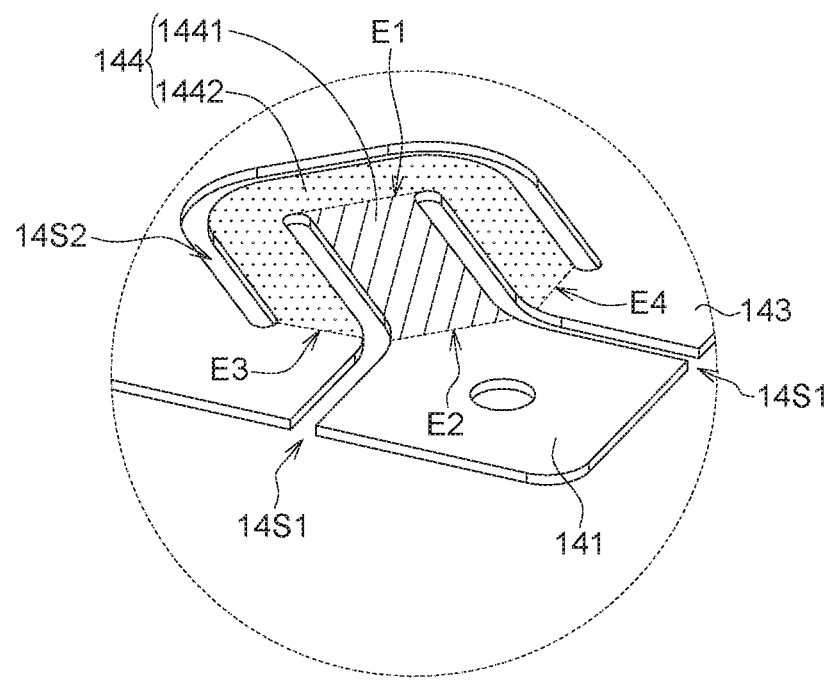
FIG. 2B shows a partially enlarged view of region A of the elastic plate of FIG. 2A.

The elastic plate 14 may further include a first elastic member 144 connected between the first portion 141 and the third portion 143, and a second elastic member 145 connected between the second portion 142 and the third portion 143. According to some embodiments, the first portion 141, the third portion 143 and the first elastic member 144 may be disposed in the same plane. According to some embodiments, the second portion 142, the third portion 143 and the second elastic member 145 may be disposed in the same plane. The first portion 141 may move relative to the third portion 143 with one degree of freedom (i.e., the movement in z-axis) via the first elastic member 144 without rotation. Specifically, as shown in FIG. 2B, the first elastic member 144 may include a first linear portion 1441 and a first U-shaped portion 1442 connected to one end E1 of the first linear portion 1441. The first elastic member 144 may be connected to the first portion 141 at the other end E2 of the first linear portion 1441. The first elastic member 144 may be connected to the third portion 143 at two ends E3 and E4 of the first U-shaped portion 1442.

Furthermore, the elastic plate 14 may have two first slots 14S1 and a first separating slot 14S2. As shown in FIG. 2B, the two first slots 14S1 may separate the first portion 141 from the third portion 143, and may further separate the first linear portion 1441 from the first U-shaped portion 1442 except for the end E1. The first separating slot 14S2 may separate the first elastic member 144 from the third portion 143, and specifically, separate the first U-shaped portion 1442 from the third portion 143 except for the two ends E3 and E4. When the first portion 141 moves, the first linear portion 1441 and the first U-shaped portion 1442 may both deform, and thus the first portion 141 may move relative to the third portion 143 with one degree of freedom (i.e., the movement in z-axis) without rotation.

Figure 2C:
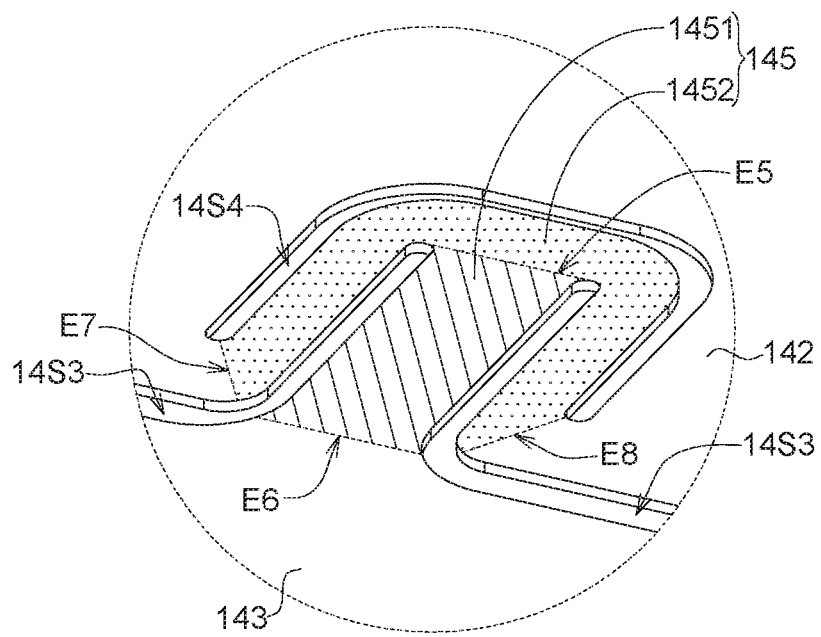
FIG. 2C shows a partially enlarged view of region B of the elastic plate of FIG. 2A.

Similarly, the second portion 142 may move relative to the third portion 143 with one degree of freedom (i.e., the movement in z-axis) via the second elastic member 145 without rotation. Specifically, as shown in FIG. 2C, the second elastic member 145 may include a second linear portion 1451 and a second U-shaped portion 1452 connected to one end E5 of the second linear portion 1451. The second elastic member 145 may be connected to the third portion 143 at the other end E6 of the second linear portion 1451. The second elastic member 145 may be connected to the second portion 142 at two ends E7 and E8 of the second U-shaped portion 1452.

Furthermore, the elastic plate 14 may have two second slots 14S3 and a second separating slot 14S4. As shown in FIG. 2C, the two second slots 14S3 may separate the third portion 143 from the second portion 142, and may further separate the second linear portion 1451 from the second U-shaped portion 1452 except for the end E5. The second separating slot 14S4 may separate the second elastic member 145 from the second portion 142, and specifically, separate the second U-shaped portion 1452 from the second portion 142 except for the two ends E7 and E8. When the second portion 142 moves, the second linear portion 1451 and the second U-shaped portion 1452 may both deform, and thus the second portion 142 may move relative to the third portion 143 with one degree of freedom (i.e., the movement in z-axis) without rotation.

Here in FIG. 2A, the first elastic member 144 may be four leaf springs each for connecting one first portion 141 and the third portion 143, and the second elastic member 145 may be four leaf springs for connecting the second portion 142 and the third portion 143. However, the present disclosure is not limited thereto.

According to the above arrangement for the elastic plate 14 of FIG. 2A, the first portion 141, the second portion 142, the third portion 143, the first elastic member 144 and the second elastic member 145 are substantially coplanar (i.e., in the same plane parallel to x-y plane), thereby reducing the overall thickness of the electronic device 1. In some embodiments, the first portion 141, the second portion 142, the third portion 143, the first elastic member 144 and the second elastic member 145 may be integrally formed into the same elastic plate. In addition, the elastic plate 14 may allow one degree of freedom of vibration for the haptic touch panel 10 and for the counter mass 12.

Referring to FIG. 1 and FIG. 2A, the first portion 141 is connected to the haptic touch panel 10 by a fixing element 15. In one embodiment, the fixing element 15 may exemplarily include four screws each for joining one first portion 141 to the haptic touch panel 10, so that the haptic touch panel 10 is allowed to move relative to the housing 11 with one degree of freedom (i.e., in directions D1 and D2 parallel to z-axis) via the first elastic member 144. In addition, the housing 11 may have four spaces 111 each for receiving one first portion 141 and one first elastic member 144 in a condition that the first portion 141 moves in direction D2.

The second portion 142 is connected to the counter mass 12 by a fixing element 16. In one embodiment, the fixing element 16 may exemplarily include a plurality of screws for joining the second portion 142 to the counter mass 12, so that the counter mass 12 is allowed to move relative to the housing 11 with one degree of freedom (i.e., in directions D1 and D2 parallel to z-axis) via the second elastic member 145. In addition, the housing 11 may have a space 112 for receiving the second portion 142 and the second elastic member 145 in a condition that the second portion 142 moves in direction D2.

The third portion 143 is connected to the housing 11 by a fixing element 17. In one embodiment, the fixing element 17 may exemplarily include a plurality of screws for joining the third portion 143 to the housing 11. In some embodiments, when vibrations of the haptic touch panel 10 and the counter mass 12 occur, the vibrations would not be transmitted to the housing 11.

The actuator 13 may be connected to the haptic touch panel 10. As shown in FIG. 1, for example, the actuator 13 may be disposed and connected between the haptic touch panel 10 and the counter mass 12 for moving the haptic touch panel 10 and the counter mass 12 relative to the housing 11 in opposite directions (i.e., in directions D1 and D2). In one embodiment, the actuator 13 may be a piezoelectric actuator exemplarily including four pieces of piezoelectric actuators in contact with the haptic touch panel 10 and the counter mass 12. The haptic touch panel includes a touch surface 101, and there may be a user interface on the touch surface 101. When the user touches the touch surface 101 of the haptic touch panel 10, the user interface receives a touch signal, and thus the actuator 13 is activated. In one embodiment, the first portion 141 of the elastic plate 14 may be further configured for sensing a touch force to the haptic touch panel 10 in directions D1 and D2. The touch force may be measured through the displacement and the stiffness of the first elastic member 144. When the touch force is over a threshold value, the actuator 13 is activated.

Figure 3:
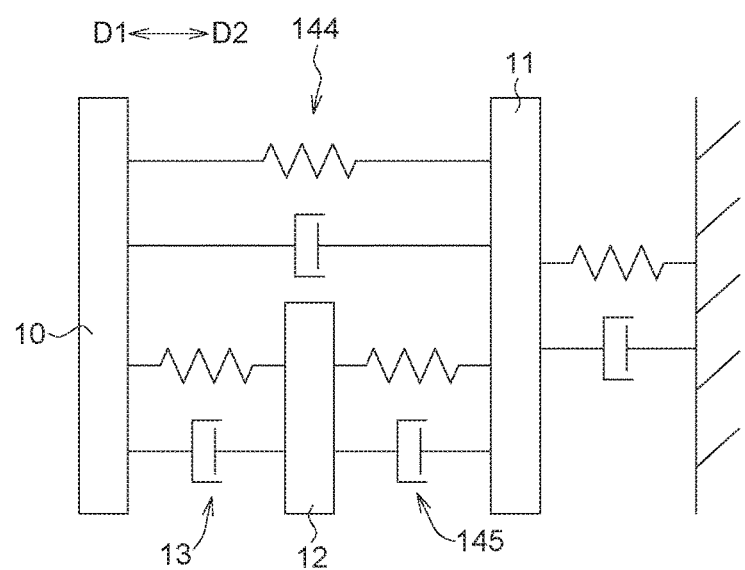
FIG. 3 schematically illustrates the electronic device of FIG. 1.

FIG. 3 schematically illustrates the electronic device 1 of FIG. 1. In FIG. 3, a mass-spring-damper system is used for describing. Referring to FIGS. 1-3, when the actuator 13 is activated, the actuator 13 exerts a mechanical force to the haptic touch panel 10 and to the counter mass 12, such that the haptic touch panel 10 and the counter mass 12 move in opposite directions. For example, the haptic touch panel 10 is subjected to a force from the actuator 13 in direction D1, and the counter mass 12 is subjected to a force from the actuator 13 in direction D2; meanwhile, the first elastic member 144 and the second elastic member 145 store elastic potential energy. Once the forces applied to the haptic touch panel 10 and to the counter mass 12 are released, the haptic touch panel 10 starts to vibrate due to the elastic potential energy stored in the first elastic member 144, thereby generating haptic feedback to the user. The vibration or movement of the haptic touch panel 10 is in a direction vertical to the touch surface 101 of the haptic touch panel 10, that is, in z-axis direction. Thus, the movement is called vertical haptic movement. Meanwhile, the counter mass 12 starts to vibrate as well due to the elastic potential energy stored in the second elastic member 145 so as to compensate or counteract vibration of the haptic touch panel 10. Similarly, the vibration or movement of the counter mass 12 is in z-axis direction. That is, during one vibration period, the counter mass 12 moves in a direction (e.g., direction D1) that is opposite to the direction (e.g., direction D2) which the haptic touch panel 10 moves in. According to some embodiments, the ratio of the weight of the haptic touch panel 10 to the stiffness of the first elastic member 144 may be adjusted, for example, may be adjusted to be substantially equal to the ratio of the weight of the counter mass 12 to the stiffness of the second elastic member 145. Therefore, the housing 11 is free from vibration.

Figure 4:
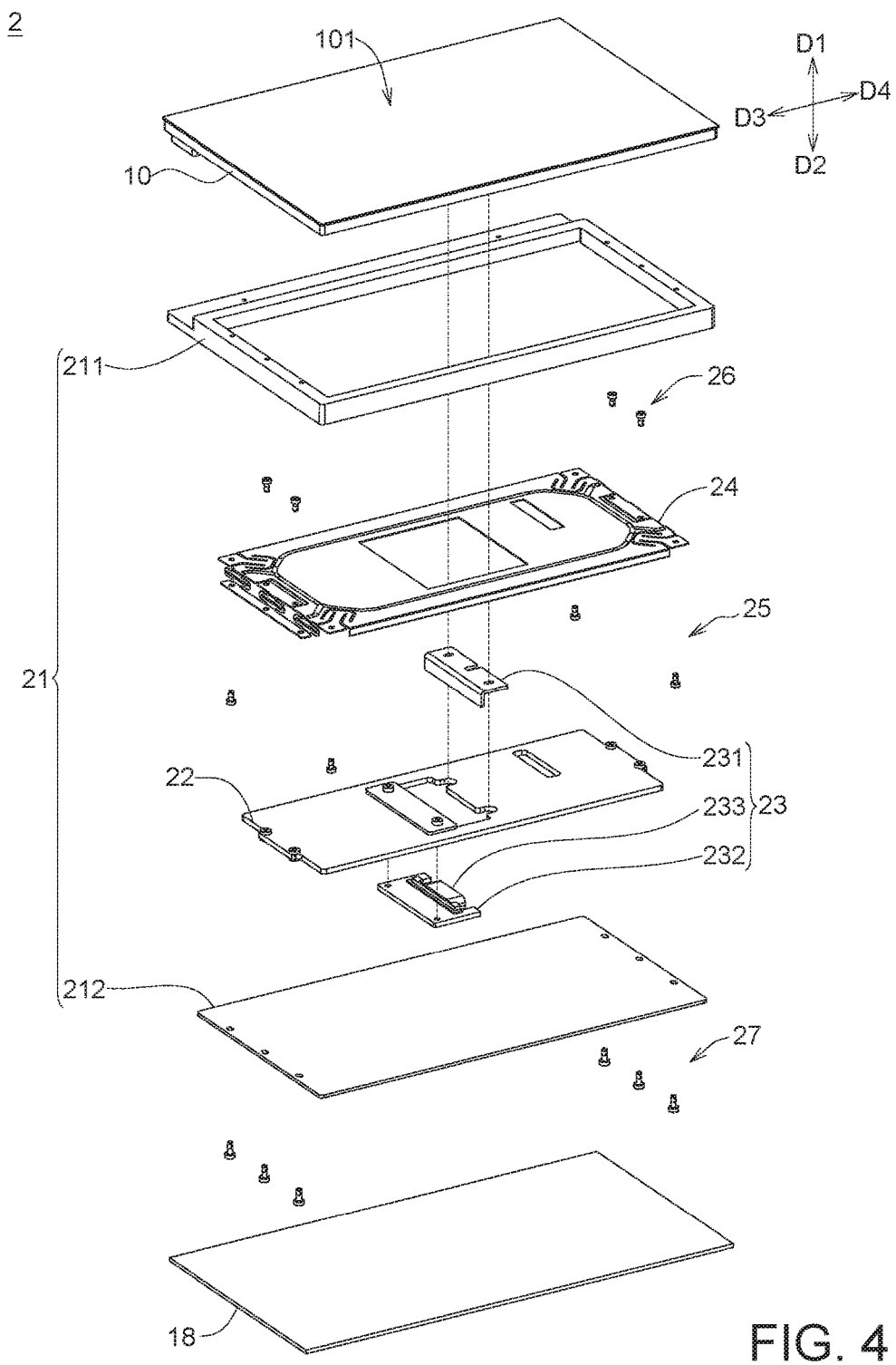
FIG. 4 shows an exploded view of an electronic device according to another embodiment of the present disclosure.

FIG. 4 shows an exploded view of an electronic device 2 according to another embodiment of the present disclosure. The elements in the present embodiment sharing similar or the same labels with those in the previous embodiment are similar or the same elements, and the description of which is omitted. The electronic device 2 as shown in the present embodiment is different from the electronic device 1 in the previous embodiment mainly in the design of the housing 21, the counter mass 22, the actuator 23 and the elastic plate 24.

The housing 21 may include an upper frame 211 and a lower plate 212. When a user touches the touch surface 101 of the haptic touch panel 10, the haptic touch panel 10 may provide horizontally dynamic vibration or movement to the user.

Figure 5A:
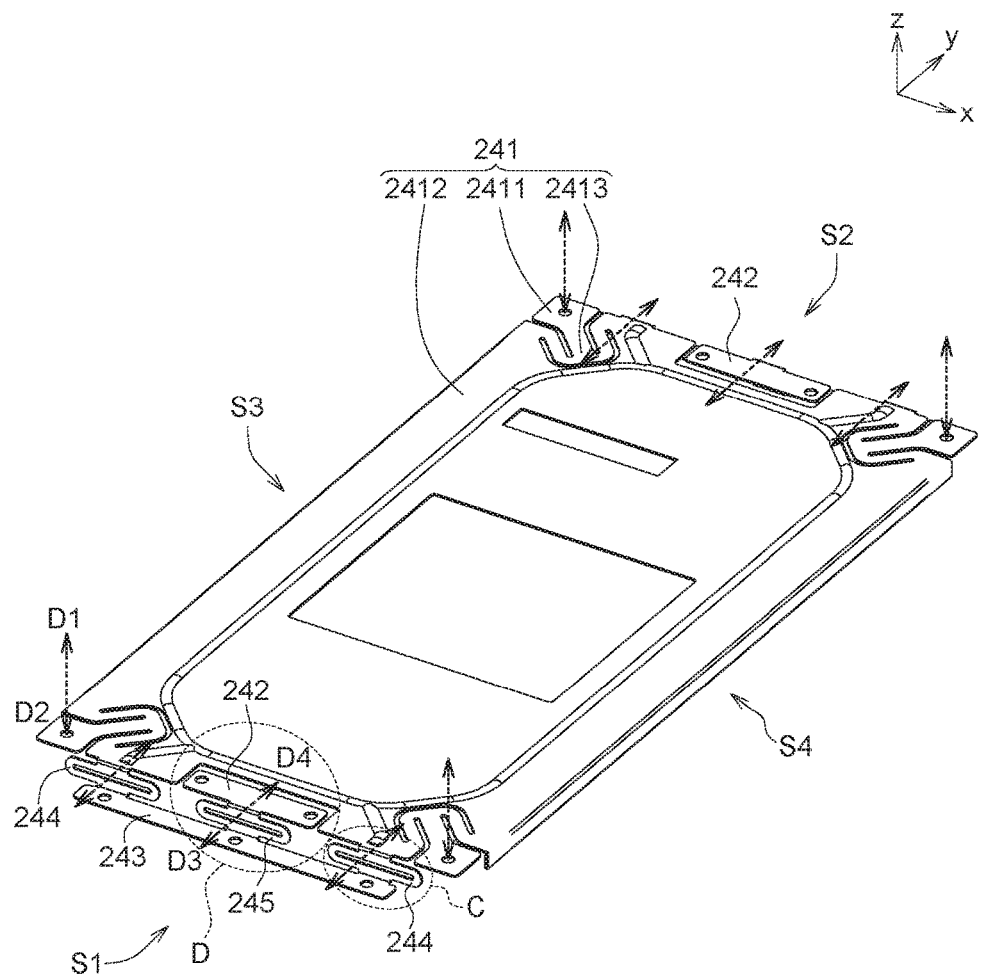
FIG. 5A shows a schematic view of an elastic plate of the electronic device of FIG. 4.

The elastic plate 24 may be connected to the haptic touch panel 10, the counter mass 22 and the housing 21. FIG. 5A shows a schematic view of the elastic plate 24 of the electronic device 2 of FIG. 4. As shown in FIG. 5A, the elastic plate 24 may include a first portion 241, a second portion 242 and a third portion 243. In one embodiment, there may be two second portions 242, one located on the side S1 of the elastic plate 24 and the other located on the opposite side S2 of the elastic plate 24. Furthermore, there may be two third portions 243, one located the side S1 of the elastic plate 24 and the other located on the opposite side S2 of the elastic plate 24. The elastic plate 24 can be symmetrical. For example, the two second portions 242 may respectively be located on the opposite sides S3 and S4 of the elastic plate 24, and the two third portions 243 may respectively be located on the opposite sides S3 and S4 of the elastic plate 24.

The elastic plate 24 may further include a first elastic member 244 connected between the first portion 241 and the third portion 243, and a second elastic member 245 connected between the second portion 242 and the third portion 243. According to some embodiments, the first portion 241 and the third portion 243 may be disposed in different planes. According to some embodiments, the second portion 242 and the third portion 243 may be disposed in different planes. According to some embodiments, the first portion 241 and the second portion 242 may be disposed in the same plane.

Figure 5B:
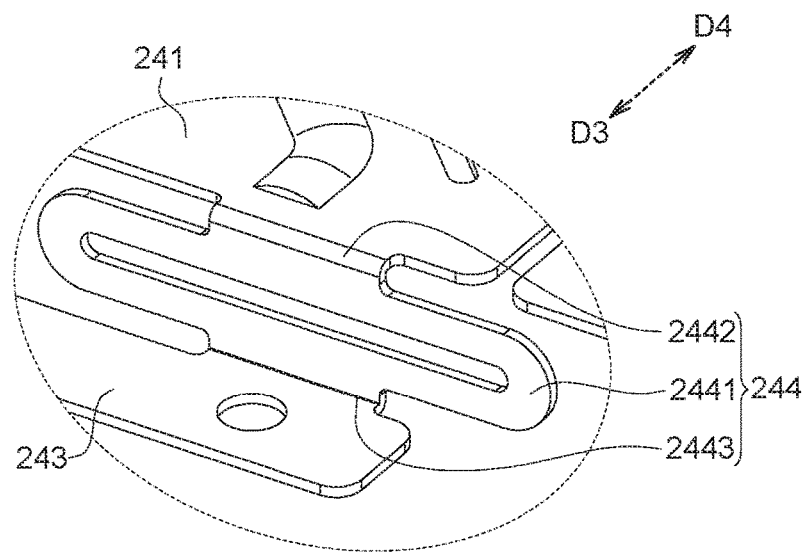
FIG. 5B shows a partially enlarged view of region C of the elastic plate of FIG. 5A.

The first portion 241 may move relative to the third portion 243 with one degree of freedom (i.e., the movement in y-axis) via the first elastic member 244. Specifically, as shown in FIG. 5B, the first elastic member 244 may include a first connecting portion 2441, a first folded portion 2442, and a second folded portion 2443. The first connecting portion 2441 is connected between the first folded portion 2442 and the second folded portion 2443. The first folded portion 2442 and the second folded portion 2443 may be respectively arranged on the upper and lower sides of the first connecting portion 2441. The first folded portion 2442 and the second folded portion 2443 may be located on different levels along a direction vertical to the touch surface 101 of the haptic touch panel 10, that is, along the z-axis direction. In other words, the first folded portion 2442 and the second folded portion 2443 are at different height levels. More in detail, the first folded portion 2442 may bend towards the first portion 241 (i.e., in direction D4) to be connected to the first portion 241, while the second folded portion 2443 may bend towards the third portion 243 (i.e., in direction D3) to be connected to the third portion 243. The first connecting portion 2441 may be disposed vertically relative to the first portion 241 and the third portion 243. That is, the first portion 241 and the third portion 243 are disposed in different planes (i.e., in different planes parallel to x-y plane).

As shown in FIG. 5A, when the first portion 241 moves, the first connecting portion 2441, the first folded portion 2442 and the second folded portion 2443 may deform, and thus the first portion 241 may move relative to the third portion 243 with one degree of freedom (i.e., the movement in y-axis). For example, if the first portion 241 moves in direction D3, the first connecting portion 2441, the first folded portion 2442 and the second folded portion 2443 may deform accordingly.

Figure 5C:
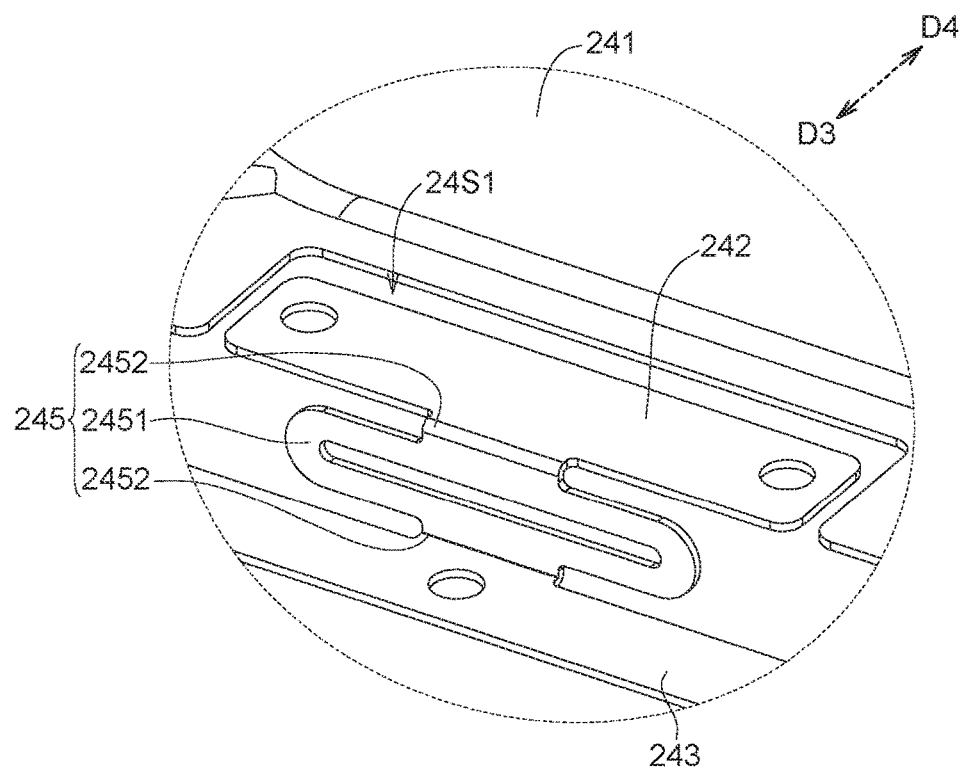
FIG. 5C shows a partially enlarged view of region D of the elastic plate of FIG. 5A.

Similarly, the second portion 242 may move relative to the third portion 243 with one degree of freedom (i.e., the movement in y-axis) via the second elastic member 245. Specifically, as shown in FIG. 5C, the second elastic member 245 may include a second connecting portion 2451, a third folded portion 2452, and a fourth folded portion 2453. The second connecting portion 2451 is connected between the third folded portion 2452 and the fourth folded portion 2453. The third folded portion 2452 and the fourth folded portion 2453 may be respectively arranged on the upper and lower sides of the second connecting portion 2451. The third folded portion 2452 and the fourth folded portion 2453 may be located on different levels along a direction vertical to the touch surface 101 of the haptic touch panel 10, that is, along the z-axis direction. In other words, the third folded portion 2452 and the fourth folded portion 2453 are at different height level. More in detail, the third folded portion 2452 may bend towards the second portion 242 (i.e., in direction D4) to be connected to the second portion 242, while the fourth folded portion 2453 may bend towards the third portion 243 (i.e., in direction D3) to be connected to the third portion 243. The second connecting portion 2451 may be disposed vertically relative to the second portion 242 and the third portion 243. That is, the second portion 242 and the third portion 243 are disposed in different planes (i.e., in different planes parallel to x-y plane). In addition, the second portion 242 and the first portion 241 may be substantially coplanar.

Furthermore, the elastic plate 24 may have a third slot 24S1. As shown in FIG. 5O, the third slot 24S1 may separate the second portion 242 from the first portion 241. Since the first portion 241 and the second portion 242 may move relative to the third portion 243 with one degree of freedom and they may be substantially coplanar, the third slot 24S1 may be sufficiently large to prevent collision of the first portion 241 and the second portion 242 once the first portion 241 moves in direction D3 and the second portion 242 moves in direction D4.

As shown in FIG. 5A and 5C, when the second portion 242 moves, the second connecting portion 2451, the third folded portion 2452 and the fourth folded portion 2453 may deform, and thus the second portion 242 may move relative to the third portion 243 with one degree of freedom (i.e., the movement in y-axis). For example, if the second portion 242 moves in direction D4, the second connecting portion 2451, the third folded portion 2452 and the fourth folded portion 2453 may deform accordingly.

Here in FIG. 5A, the first elastic member 244 may be four leaf springs, two of which disposed on the side S1 of the elastic plate 24 for connecting the first portion 241 and the third portion 243 on side S1 and the other two disposed on the opposite side S2 of the elastic plate 24 for connecting the first portion 241 and the third portion 243 on side S2. Furthermore, the second elastic member 245 may be two leaf springs, one disposed on the side S1 of the elastic plate 24 for connecting the second portion 242 and the third portion 243 on side S1 and the other disposed on the opposite side S2 of the elastic plate 24 for connecting the first portion 241 and the third portion 243 on side S2. The elastic plate 24 may be symmetrical. For example, the first elastic member 244 and the second elastic member 245 may both disposed on the opposite sides S3 and S4 of the elastic plate 24.

According to the above arrangement for the elastic plate 24 of FIG. 5A, the first portion 241 and the third portion 243 may be disposed in different planes (i.e., in different planes parallel to x-y plane), and the second portion 242 and the third portion 243 may be disposed in different planes (i.e., in different planes parallel to x-y plane). In addition, the elastic plate 24 may allow one degree of freedom of vibration for the haptic touch panel 10 and for the counter mass 22.

Referring to FIG. 4 and FIG. 5A, the first portion 241 is connected to the haptic touch panel 10. More specifically, the first portion 241 may include a first sub-portion 2411 and a second sub-portion 2412 with a third elastic member 2413 connected between the first sub-portion 2411 and the second sub-portion 2412. The first portion 241 may be connected to the haptic touch panel 10 via the first sub-portion 2411. The first sub-portion 2411 and the third elastic member 2413 may have similar geometry and configuration to that of the first portion 141 and the first elastic ember 144 as shown in FIG. 2A and as described above, and the description of which is omitted. The first sub-portion 2411, the second sub-portion 2412 and the third elastic member 2413 may be substantially coplanar.

The first sub-portion 2411 of the first portion 241 is connected to the haptic touch panel 10 by a fixing element 25. In one embodiment, the fixing element 25 may exemplarily include four screws each for joining one first sub-portion 2411 to the haptic touch panel 10, so that the haptic touch panel 10 is allowed to move with one degree of freedom (i.e., in directions D1 and D2 parallel to z-axis) via the third elastic member 2413.

As shown in FIG. 5A, the first portion 241 is connected to the first elastic member 244 via the second sub-portion 2412, and the first portion 241 is connected to the haptic touch panel 10 via the first sub-portion 2411. The haptic touch panel 10 is allowed to move relative to the housing 21 with another degree of freedom (i.e., in directions D3 and D4 parallel to y-axis) via the first elastic member 244.

The second portion 242 is connected to the counter mass 22 by a fixing element 26. In one embodiment, the fixing element 26 may exemplarily include a plurality of screws for joining the second portions 242 to the counter mass 22, so that the counter mass 12 is allowed to move relative to the housing 21 with one degree of freedom (i.e., in directions D3 and D4 parallel to y-axis) via the second elastic members 245.

The third portion 243 is connected to the housing 21 by a fixing element 27. In one embodiment, the fixing element 27 may exemplarily include a plurality of screws for joining the third portions 243 to the lower plate 212 and the upper frame 211 of the housing 21. In some embodiments, when vibrations of the haptic touch panel 10 and the counter mass 22 occur, the vibrations would not be transmitted to the housing 21.

As shown in FIG. 4, the actuator 23 is disposed and connected between the haptic touch panel 10 and the counter mass 22 for moving the haptic touch panel 10 and the counter mass 22 relative to the housing 11 in opposite directions (i.e., in directions D3 and D4). In one embodiment, the actuator 23 may be a magnetic actuator exemplarily including a first component 231 for moving the haptic touch panel 10, a second component 232 for moving the counter mass 22, and a core 233 for driving the first component 231 and the second component 232. When the user touches the touch surface 101 of the haptic touch panel 10, the user interface receives a touch signal, and thus the actuator 23 is activated. In one embodiment, the first sub-portion 2411 of the first portion 241 of the elastic plate 24 is further configured for sensing a touch force to the haptic touch panel 10 in directions D1 and D2. The touch force may be measured through the displacement and the stiffness of the third elastic member 2413. When the touch force is over a threshold value, the actuator 23 is activated.

Figure 6:
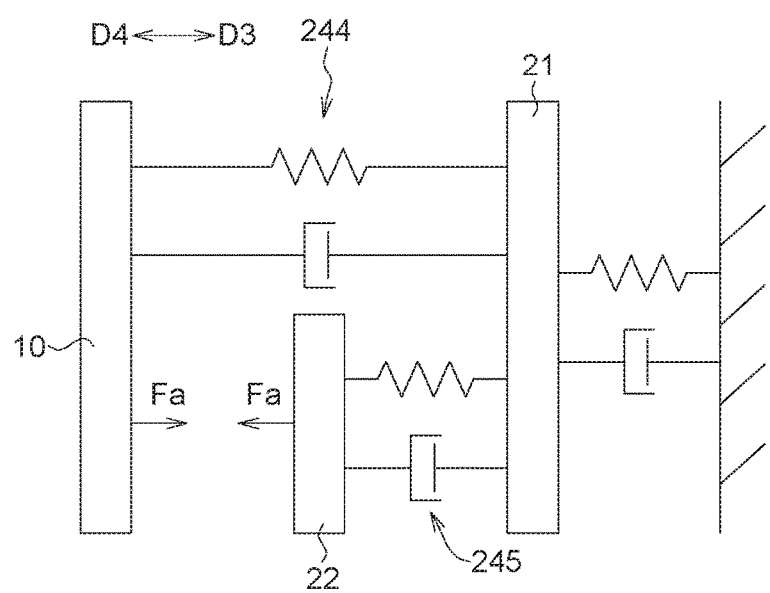
FIG. 6 schematically illustrates the electronic device of FIG. 4.

FIG. 6 schematically illustrates the electronic device 2 of FIG. 4. In FIG. 6, a mass-spring-damper system is used for describing. Referring to FIGS. 4-6, when the actuator 23 is activated, the first component 231 and the second component 232 of the actuator 23 exerts a mechanical force to the haptic touch panel 10 and to the counter mass 22, such that the haptic touch panel 10 and the counter mass 22 move in opposite directions. For example, the haptic touch panel 10 is subjected to a force Fa from the first component 231 of the actuator 23 in direction D3, and the counter mass 22 is subjected to a force Fa from the second component 232 of the actuator 23 in direction D4; meanwhile, the first elastic member 244 and the second elastic member 245 store elastic potential energy. Once the forces Fa applied to the haptic touch panel 10 and to the counter mass 22 are released, the haptic touch panel 10 starts to vibrate due to the elastic potential energy stored in the first elastic member 244, thereby generating haptic feedback to the user. The vibration or movement of the haptic touch panel 10 is in a direction horizontal to the touch surface 101 of the haptic touch panel, that is, horizontal to the x-y plane. For example, direction D3 or D4. Thus, the movement is called horizontal (or lateral) haptic movement. Meanwhile, the counter mass 22 starts to vibrate as well due to the elastic potential energy stored in the second elastic member 245 so as to compensate or counteract vibration of the haptic touch panel 10. Similarly, the vibration or movement of the counter mass 22 is in a direction horizontal to the touch surface 101, that is, horizontal to the x-y plane. For example, in direction D3 or D4. That is, during one vibration period, the counter mass 22 moves in a direction (e.g., direction D3) that is opposite to the direction (e.g., direction D4) which the haptic touch panel 10 moves in. According to some embodiments, the ratio of the weight of the haptic touch panel 10 to the stiffness of the first elastic member 244 may be adjusted according to requirements, for example, may be adjusted to be substantially equal to the ratio of the weight of the counter mass 22 to the stiffness of the second elastic member 245. Therefore, the housing 21 is free from vibration.

According to some embodiments, the electronic device includes a haptic touch panel, a housing, a counter mass, an actuator and an elastic plate. The elastic plate includes a first portion connected to a haptic touch panel, a second portion connected to a counter mass, and a third portion connected to a housing. The counter mass may compensate or counteract vibration of the haptic touch panel, such that the vibration will not be transmitted to the housing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device comprising:
   a haptic touch panel including a touch surface;
   a housing;
   a counter mass;
   an actuator connected between the haptic touch panel and the counter mass for moving the haptic touch panel and the counter mass relative to the housing in opposite directions; and
   an elastic plate comprising a first portion connected to the haptic touch panel, a second portion connected to the counter mass, and a third portion connected to the housing.

2. The electronic device according to claim 1, wherein the elastic plate further comprises a first elastic member connected between the first portion and the third portion, and a second elastic member connected between the second portion and the third portion.

3. The electronic device according to claim 2, wherein the first portion, the third portion and the first elastic member are disposed in the same plane.

4. The electronic device according to claim 3, wherein the elastic plate has a first separating slot separating the first elastic member from the third portion.

5. The electronic device according to claim 2, wherein the second portion, the third portion and the second elastic member are disposed in the same plane.

6. The electronic device according to claim 5, wherein the elastic plate has a second separating slot separating the second elastic member from the second portion.

7. The electronic device according to claim 2, wherein the first portion and the third portion are disposed in different planes.

8. The electronic device according to claim 7, wherein the first elastic member comprises a first folded portion, a second folded portion and a first connecting portion between the first folded portion and the second folded portion, and the first folded portion and the second folded portion are located on different levels along a direction vertical to the touch surface of the haptic touch panel.

9. The electronic device according to claim 2, wherein the second portion and the third portion are disposed in different planes.

10. The electronic device according to claim 9, wherein the second elastic member comprises a third folded portion, a fourth folded portion and a second connecting portion between the third folded portion and the fourth folded portion, and the third folded portion and the fourth folded portion are located on different levels along a direction vertical to the touch surface of the haptic touch panel.

11. The electronic device according to claim 2, wherein the first elastic member and the second elastic member are formed of leaf springs.

12. The electronic device according to claim 1, wherein movements of the haptic touch panel and the counter mass generated by the actuator are in a direction vertical to the touch surface of the haptic touch panel.

13. The electronic device according to claim 1, wherein movements of the haptic touch panel and the counter mass generated by the actuator are in a direction horizontal to the touch surface of the haptic touch panel.

14. The electronic device according to claim 1, wherein the actuator is a piezoelectric actuator or a magnetic actuator.

* * * * *